United States Patent Office 3,437,542
Patented Apr. 8, 1969

3,437,542
PROCESS FOR BONDING SURFACES
John Arthur Mills, Stockbridge, England, assignor to The Borden Company, New York, N.Y., a corporation of New Jersey
No Drawing. Filed Apr. 8, 1965, Ser. No. 446,705
Int. Cl. C09j *3/08*
U.S. Cl. 156—331          2 Claims

ABSTRACT OF THE DISCLOSURE

This invention relates to a process for bonding surfaces together which comprises applying to at least one of the surfaces to be bonded and at the surface only, a hardenable liquid resinous component and a second component which is a powder hardener for the resinous component. Thereafter, the surfaces to be bonded are brought together and the components are hardened.

---

This invention relates to a bonding process and particularly to a process of applying to a surface an adhesive composition which is not normally spreadable.

In the bonding of wood and like porous material, it is common practice to employ adhesive compositions comprising a hardenable resinous component, a hardener or curing agent therefor, said hardener serving to effect curing of the resinous component, either in the cold or upon heating, with or without a filler serving to increase the viscosity of the composition and reduce penetration into the substrate.

It is a disadvantage of such compositions that the increase in viscosity effected by the inclusion of a filler renders it difficult to obtain an even and economically thin coating of the adhesive composition on the substrate. A further disadvantage is that the filler constitutent, unless it has a specific gravity similar to that of the resinous component, tends to separate on standing.

It is also well known that difficulties arise when synthetic resin adhesives containing curing agents are employed, as a result of the limited working life of such mixes. Particularly in the case of cold-setting compositions it is necessary to compromise to obtain an adequate working life before application to the surface coupled with the fastest possible setting rate after application to the surface.

In an attempt to overcome this difficulty it has been proposed to apply a liquid curing agent to one of the surfaces to be bonded and to apply a liquid resinous composition having a long working life to a second surface, the two surfaces being brought into contact only immediately prior to a pressing operation.

Such a procedure, however, has the disadvantage that the curing agent tends to penetrate into or through the substrate. In addition, the curing agent employed is frequently a highly acidic substance which may have a deleterious effect on materials which are susceptible to acidic conditions. Furthermore, the known procedure, commonly referred to as the "separate-application" method, does not solve the problems associated with the use of a filler.

We have now found that these several disadvantages may be overcome by applying separately and successively to the surface to be bonded, a liquid resinous component and a second component in powder form, said second component comprising a filler or hardener.

We have also found that, in order to achieve a thin and even spread of the liquid resinous component, application by means of a curtain coater is highly advantageous.

Accordingly, the present invention comprises a method of bonding surfaces, particularly porous surfaces, which comprises applying separately and successively to at least one of the surfaces to be bonded (1) a spray-coating of a liquid, hardenable resinous component and (2) a second component compirsing a powder hardener for the liquid resinous component and optionally, a filler, bringing the surfaces together and allowing the composition to harden; preferably, the liquid resinous component is applied by means of a curtain coater.

The liquid resinous component employed may be any of the hardenable liquid synthetic resin compositions commonly employed as adhesives. Suitable resins include the condensation products of urea and formaldehyde, phenol and formaldehyde, melamine and formaldehyde and the like.

The powdered component may with advantage include both filler and hardener. Where the liquid component is a urea-formaldehyde resin, for example, a suitable powder component may comprise woodflour, slate-flour, wheat-flour, starch, clay, calcium sulphate, chalk or other inert particulate materials as filler and an ammonium salt as a hardener. The ammonium salt may be mixed with, or replaced by, other substances exerting a hardening action on urea-formaldehyde condensation products, such as citric acid, oxalic acid, tartaric acid, aluminum sulphate, magnesium silicofluoride and like acid-reacting substances.

Where the liquid component is a phenol-formaldehyde resin the powder component may comprise woodflour, coconut shell flour, slate-flour, wheat-flour, starch, clay, calcium sulphate and/or chalk as the filler component and paraformaldehyde or powdered tannin extracts as the hardener component.

Another type of filler which may be used in compositions of the present invention are the finely-divided synthetic resins such as the fusible, potentially thermosetting resins.

It is to be understood that it is within the scope of this invention to incorporate a part or all of the filler into the liquid component. It may be advantageous to incorporate a hardener in the liquid component preferably one which is slow-acting in addition to employing a rapid-acting hardener in the powder component. In this way, it is possible to compensate for any lack of uniform distribution of the powdered component upon the liquid component while retaining a comparatively long working life for the liquid component.

Examples of the ammonium salts include ammonium sulphate, nitrate, chloride, silicofluoride, phosphate, citrate, oxalate, and other ammonium salts of organic and inorganic acids.

The powder compnent may be distributed over the liquid component in any convenient manner. The preferred method of application is by means of a vibrating screen. It will in many cases be most advantageous to arrange a transport mechanism beneath the curtain coater and powder distributor so that the workpiece to be coated is conveyed in such a manner as to pass successively beneath a curtain coating device and the powder distributing means. In certain cases, however, particularly in the case of large units of inconvenient shapes, the liquid and powder distributing devices may be caused to move over the surface of the work-piece while the latter remains static.

In the following examples all parts and percentages are by weight:

EXAMPLE 1

To 100 parts of a conventional liquid urea-formaldehyde resin, having a solids content of 67% were added 65 parts of china clay, 30 parts of water, 2 parts of rye flour, 2 parts of tricalcium phosphate, 10 parts of urea and 0.5 part of ammonium sulphate. The mixture so prepared had a working life (that is remained liquid and useable) in excess of 8 hours at room temperature.

The mix was spread by means of a curtain coater on to wood veneer at the rate of 3.5 pounds per 100 square feet.

A powder mixture of equal parts of hydrated aluminium sulphate and china clay was then sprinkled evenly over the coated surface while the liquid composition was still moist at the rate of 0.7 pound per 100 square feet. The coated surface was then placed in contact with a sheet of hardboard and the assembly placed under a pressure of 200 pounds per square inch for 1 hour at a temperature of 65° F. On testing after this period an excellent bond was found to have been achieved, giving 100% fibre failure.

A plywood panel was then prepared using the same procedure except that the two veneers were coated and the hardboard was replaced by a third, uncoated veneer. After pressing for 24 hours the panel was tested in accordance with British standard specification No. 1,203 and the following results, in which the figures quoted are the average of 6 specimens were obtained:

Failing load (pounds per square inch): A, 358; B, 193; C, 107.

A control panel, made using the liquid component alone, gave the following results when tested under similar conditions:

Failing load (pounds per square inch): A, 299; B, 90 [1]; C, 0.[2]

EXAMPLE 2

A liquid adhesive composition was preparing by mixing 100 parts of a conventional liquid urea-formaldehyde resin of 65% solids content sold under the trade name Casco-Resin F and 20 parts of a slow hardener comprising 2.5% ammonium sulphate, 50% urea, 10% rye flour and 37.5% inorganic clay filler. This composition had a useable life of 8 hours at 70° F. and was used to coat a hardboard panel by means of a curtain coater at the rate of four pounds per 100 square feet. To the coated surface was then applied, at a rate of one gram per square foot, a mixture comprising equal weights of a conventional spray-dried urea-formaldehyde resin sold under the trade name Cascamite 6–D and finely divided hydrated aluminium sulphate. The coated hardboard was then assembled with softwood battens so as to form a flush door and the assembly placed under pressure in a cold-press for 24 hours.

On removal from the press, the assembly was tested to destruction, both in the dry state and after immersion in water under different conditions, to give the following results:

Fibre failure (percent)
A ---------------------------------------- 59
B ---------------------------------------- 66
C ---------------------------------------- 67

[1] One test piece only—all others failed before loading.
[2] All test pieces failed before loading.

Very little fibre failure was obtained in the case of an otherwise comparable door made with the same liquid mix, but without employing the powder component.

The conditions under which the three sets of figures were obtained were:

A.—In the dry state.
B.—After soaking in water for 24 hours at 70° F.
C.—After soaking in water for 3 hours at 67° C.

It will be understood from the preceding description that references to the application of a "spray coating" are to include the case where a continuous film of liquid is allowed to escape from a slit in an applicator as well as to more commonly understood methods of ejecting the material under pressure through a nozzle to provide a spray.

It will be understood that it is intended to cover all changes and modifications of the examples of the invention herein chosen for the purpose of illustration which do not constitute departures from the spirit and scope of the invention.

I claim:
1. The process of bonding porous surfaces comprising the steps of:
    (1) applying separately and successively to at least one of the surfaces to be bonded and at the surface only,
        (a) a coating of a hardenable liquid resinous component being the condensation product of phenol and formaldehyde, and (b) a second component comprising a powder hardener for said condensation product, said hadrener being selected from the group consisting of paraformaldehyde and tannin extracts;
    (2) bringing the surfaces to be bonded together, and;
    (3) hardening the components.

2. The process of claim 1, including a filler selected from the group consisting of woodflour, coconut shell flour, slate-flour, wheat-flour, starch, clay, calcium sulphate, chalk, and finely divided fusible, potentially thermosetting resins in said second component.

References Cited

UNITED STATES PATENTS

| | | | |
|---|---|---|---|
| 2,302,309 | 11/1942 | Glarum et al. | 260—9 |
| 2,399,489 | 4/1946 | Landes | 260—9 |
| 2,414,414 | 1/1947 | Rhodes | 161—257 X |
| 2,746,898 | 5/1956 | Buckwalter et al. | 161—188 X |
| 2,817,620 | 12/1957 | Golick et al. | 161—261 X |

HAROLD ANSHER, Primary Examiner.

U.S. Cl. X.R.

156—310; 161—188, 262